US 9,975,210 B1

(12) United States Patent
Cox et al.

(10) Patent No.: US 9,975,210 B1
(45) Date of Patent: May 22, 2018

(54) ROTATIONAL DRILL BITS AND DRILLING APPARATUSES INCLUDING THE SAME

(71) Applicant: Dover BMCS Acquisition Corporation, Orem, UT (US)

(72) Inventors: E. Sean Cox, Spanish Fork, UT (US); Russell Roy Myers, Provo, UT (US)

(73) Assignee: DOVER BMCS ACQUISITION CORPORATION, Orem, UT (US)

(*) Notice: Subject to any disclaimer, the term of this patent is extended or adjusted under 35 U.S.C. 154(b) by 134 days.

(21) Appl. No.: 14/740,737

(22) Filed: Jun. 16, 2015

Related U.S. Application Data

(63) Continuation of application No. 13/290,203, filed on Nov. 7, 2011, now Pat. No. 9,080,400.

(60) Provisional application No. 61/417,019, filed on Nov. 24, 2010.

(51) Int. Cl.
E21B 10/55 (2006.01)
B23P 15/32 (2006.01)
B23C 3/00 (2006.01)
E21B 10/54 (2006.01)

(52) U.S. Cl.
CPC ........... B23P 15/32 (2013.01); B23C 3/00 (2013.01); E21B 10/55 (2013.01); B23C 2220/56 (2013.01); E21B 2010/545 (2013.01)

(58) Field of Classification Search
CPC .......... E21B 10/60; E21B 10/42; E21B 10/54; E21B 10/56; E21B 10/58
USPC .... 175/417, 418, 420.1, 426, 427, 428, 429; 299/34.03
See application file for complete search history.

(56) References Cited

U.S. PATENT DOCUMENTS

| 1,288,893 A | 12/1918 | Holmes |
| 1,943,880 A | 1/1934 | Brady |
| 2,578,593 A | 12/1951 | Phipps |
| 3,163,246 A | 12/1964 | Vagins et al. |
| 4,189,013 A | 2/1980 | Adams et al. |
| 4,190,128 A | 2/1980 | Emmerich |
| 4,216,832 A | 8/1980 | Stephenson et al. |
| 4,330,044 A | 5/1982 | Orr et al. |
| 4,350,215 A | 9/1982 | Radtke |

(Continued)

FOREIGN PATENT DOCUMENTS

GB 2355035 A 4/2001

OTHER PUBLICATIONS

Webster's Revised Unabridged Dictionary (G & C. Merriam Co., 1913, edited by Noah Porter).

Primary Examiner — Robert E Fuller
Assistant Examiner — David Carroll
(74) Attorney, Agent, or Firm — Fisherbroyles, LLP

(57) ABSTRACT

A method for manufacturing a roof-bolt drill bit includes providing a bit body rotatable about a rotational axis in a rotational direction, the rotational axis extending between a forward end and a rearward end of the bit body, the bit body comprising a mounting region for mounting at least one cutting element to the bit body. The method includes forming at least one primary debris channel in the bit body, the at least one primary debris channel extending from adjacent the mounting region to a portion of the bit body located axially rearward from the mounting region, and forming at least one secondary debris channel in the bit body by machining a portion of the bit body along a substantially straight path to form an intersection with the primary debris channel.

17 Claims, 5 Drawing Sheets

(56) References Cited

U.S. PATENT DOCUMENTS

| | | | |
|---|---|---|---|
| 4,352,400 A * | 10/1982 | Grappendorf | E21B 10/04 175/394 |
| 4,446,936 A | 5/1984 | Sarin et al. | |
| 4,488,609 A | 12/1984 | Sarin | |
| 4,492,278 A | 1/1985 | Leighton | |
| 4,515,230 A | 5/1985 | Means et al. | |
| 4,527,931 A | 7/1985 | Sarin | |
| 4,550,791 A | 11/1985 | Isakov | |
| 4,605,079 A | 8/1986 | Leibee et al. | |
| 4,712,626 A | 12/1987 | Shaw | |
| 4,794,994 A | 1/1989 | Deane et al. | |
| 4,848,489 A | 7/1989 | Deane | |
| 4,848,491 A | 7/1989 | Burridge et al. | |
| 4,883,132 A | 11/1989 | Tibbitts | |
| 4,887,677 A | 12/1989 | Warren et al. | |
| 4,946,314 A | 8/1990 | Gruber | |
| 5,025,875 A | 6/1991 | Witt | |
| 5,180,022 A | 1/1993 | Brady | |
| 5,220,967 A | 6/1993 | Monyak | |
| 5,287,937 A | 2/1994 | Sollami et al. | |
| 5,301,763 A | 4/1994 | Peay et al. | |
| 5,303,787 A | 4/1994 | Brady | |
| 5,400,861 A | 3/1995 | Sheirer | |
| 5,429,199 A | 7/1995 | Sheirer et al. | |
| 5,443,565 A | 8/1995 | Strange, Jr. | |
| 5,447,208 A | 9/1995 | Lund et al. | |
| 5,452,628 A * | 9/1995 | Montgomery, Jr. | B21K 5/02 175/393 |
| 5,458,210 A | 10/1995 | Sollami | |
| 5,699,868 A | 12/1997 | Caraway et al. | |
| 5,967,247 A | 10/1999 | Pessier | |
| 6,021,858 A | 2/2000 | Southland | |
| 6,026,918 A * | 2/2000 | Briese | E21B 10/46 175/414 |
| 6,062,325 A | 5/2000 | Taylor et al. | |
| 6,109,377 A | 8/2000 | Massa et al. | |
| 6,123,160 A | 9/2000 | Tibbitts | |
| 6,125,947 A | 10/2000 | Trujillo et al. | |
| 6,145,606 A | 11/2000 | Haga | |
| 6,193,722 B1 | 2/2001 | Zech et al. | |
| 6,302,223 B1 | 10/2001 | Sinor | |
| 6,321,862 B1 | 11/2001 | Beuershausen et al. | |
| 6,595,305 B1 | 7/2003 | Dunn et al. | |
| 6,684,968 B2 | 2/2004 | Bise et al. | |
| 6,834,733 B1 | 12/2004 | Maouche et al. | |
| 6,915,867 B2 | 7/2005 | Bise | |
| 7,896,580 B2 | 3/2011 | Weaver et al. | |
| 7,913,779 B2 * | 3/2011 | Choe | E21B 10/00 175/374 |
| 2004/0262045 A1 * | 12/2004 | Bise | E21B 10/58 175/419 |
| 2007/0119624 A1 | 5/2007 | Brady | |
| 2007/0235230 A1 * | 10/2007 | Cuillier | E21B 10/573 175/428 |
| 2008/0264696 A1 * | 10/2008 | Dourfaye | E21B 10/573 175/428 |
| 2011/0031032 A1 * | 2/2011 | Mourik | C22C 26/00 175/428 |
| 2011/0284294 A1 * | 11/2011 | Cox | E21B 10/43 175/431 |
| 2011/0297451 A1 * | 12/2011 | Cox | E21B 10/602 175/428 |
| 2013/0292188 A1 * | 11/2013 | Bilen | E21B 10/5676 175/428 |

* cited by examiner

ROTATIONAL DRILL BITS AND DRILLING APPARATUSES INCLUDING THE SAME

REFERENCE TO RELATED APPLICATIONS

This application is a continuation of U.S. patent application Ser. No. 13/290,203 filed 7 Nov. 2011, which claims priority to U.S. Provisional Application No. 61/417,019 filed 24 Nov. 2010, each of which is hereby incorporated by reference in its entirety.

BACKGROUND

Cutting elements are traditionally utilized for a variety of material removal processes, such as machining, cutting, and drilling. For example, tungsten carbide cutting elements have been used for machining metals and on drilling tools for drilling subterranean formations. Similarly, polycrystalline diamond compact (PDC) cutters have been used to machine metals (e.g., non-ferrous metals) and on subterranean drilling tools, such as drill bits, reamers, core bits, and other drilling tools. Other types of cutting elements, such as ceramic (e.g., cubic boron nitride, silicon carbide, and the like) cutting elements or cutting elements formed of other materials have also been utilized for cutting operations.

Drill bit bodies to which cutting elements are attached are often formed of steel or of molded tungsten carbide. Drill bit bodies formed of molded tungsten carbide (so-called matrix-type bit bodies) are typically fabricated by preparing a mold that embodies the inverse of the desired topographic features of the drill bit body to be formed. Tungsten carbide particles are then placed into the mold and a binder material, such as a metal including copper and tin, is melted or infiltrated into the tungsten carbide particles and solidified to form the drill bit body. Steel drill bit bodies, on the other hand, are typically fabricated by machining a piece of steel to form the desired external topographic features of the drill bit body. Steel drill bit bodies may also be fabricated by casting or forging a steel part and then machining the part to have the desired topographic features.

In some situations, drill bits employing cutting elements may be used in subterranean mining to drill roof-support holes. For example, in underground mining operations, such as coal mining, tunnels must be formed underground. In order to make certain tunnels safe for use, the roofs of the tunnels must be supported in order to reduce the chances of a roof cave-in and/or to block various debris falling from the roof. In order to support a roof in a mine tunnel, boreholes are typically drilled into the roof using a drilling apparatus. The drilling apparatus commonly includes a drill bit attached to a drilling rod (commonly referred to as a "drill steel"). Roof bolts are then inserted into the boreholes to support the roof and/or to anchor a support panel to the roof. The drilled boreholes may be filled with a hardenable resin prior to inserting the bolts, or the bolts may have self expanding portions, in order to anchor the bolts to the roof.

Various types of cutting elements, such as PDC cutters, have been employed for drilling boreholes for roof bolts. Although other configurations are known in the art, PDC cutters often comprise a substantially cylindrical or semi-cylindrical diamond "table" formed on and bonded under high-pressure and high-temperature (HPHT) conditions to a supporting substrate, such as a cemented tungsten carbide (WC) substrate.

During drilling operations, heat may be generated in the drill bit due to friction between the drill bit and a subterranean formation being drilled, causing the drilling equipment to become worn or damaged. The amount of heat generated during cutting operations may be increased by cutting debris, such as rock debris, that is not effectively carried away from the drill bit during drilling. In order to cool the cutting elements and clear debris away, a vacuum may be used to draw material away from the cutting region. Unfortunately, debris is often not effectively directed into vacuum ports, such as ports formed in the side of the drill bit. The vacuum ports may become clogged by the cutting debris and/or the vacuum may lose suction as a result of excess debris around the drill bit, resulting in excess heat being generated in the drill bit during drilling.

Clogging of the drill bit and loss of suction may reduce the rate of penetration of the drill bit into a material being drilled, such as a subterranean rock material, causing delays in drilling operations. Such problems may also cause the drill bit to become worn and damaged due to a lack of adequate cooling and material removal, causing additional delays for maintenance and/or replacement of the drill bit. Avoiding such delays may reduce unnecessary downtime and production losses, which may be particularly important during bolting operations in mine tunnels due to various safety hazards present in those environments.

SUMMARY

The instant disclosure is directed to exemplary roof-bolt drill bits. In some embodiments, a roof-bolt drill bit may comprise at least one cutting element and a bit body rotatable about a rotational axis in a rotational direction, with the rotational axis extending between a forward end and a rearward end of the bit body. The at least one cutting element may be mounted to the bit body at the forward end. The at least one cutting element may also include a cutting face and a cutting edge adjacent the cutting face. In various embodiments, the at least one cutting element may comprise a superabrasive material (e.g., polycrystalline diamond) bonded to a substrate. The bit body may comprise at least one debris port defined in a side portion of the bit body located axially rearward from at least a portion of the at least one cutting element (e.g., the cutting edge).

According to some embodiments, an internal passage may be defined within the bit body. The internal passage may comprise a vacuum hole configured to draw debris away from the at least one cutting element. The internal passage may extend between the at least one debris port and the rearward end of the bit body. At least one primary debris channel may be defined in the bit body. The at least one primary debris channel may be configured to direct debris from the at least one cutting element toward the at least one debris port when the drill bit is rotated in the rotational direction. The at least one debris port may extend along a substantially straight path between the peripheral side surface and the internal passage.

In various embodiments, the bit body may comprise a peripheral side surface located at a peripheral radial distance relative to the rotational axis. The at least one primary debris channel may be defined radially inward from the peripheral radial distance. The at least one primary debris channel may be defined by at least two channel surfaces extending inward from the peripheral radial distance. A first channel surface of the at least two channel surfaces may be substantially parallel to the cutting face of the at least one cutting element. A second channel surface of the at least two channel surfaces may be substantially perpendicular to the cutting face of the at least one cutting element. In some embodiments, at least a portion of the second channel surface of the at least two channel surfaces may slope away from a region adjacent the at least one cutting element in a direction that is generally rearward. Additionally, the first channel surface and the second channel surface of the at least two channel surfaces may intersect at an intersection region.

According to certain embodiments, the bit body may comprise at least one secondary debris channel extending between the at least one primary debris channel and the at least one debris port. The at least one secondary debris channel may be configured to accept debris from the at least one primary debris channel. The at least one secondary debris channel may be defined by at least one surface extending radially inward from the peripheral radial distance. In some embodiments, the at least one surface defining the at least one secondary debris channel may comprise a generally arcuate surface.

The at least one surface defining the at least one secondary debris channel may intersect at least one surface defining the at least one primary debris channel. An intersection region between the at least one primary debris channel and the at least one secondary debris channel may form an edge feature that is disposed radially inward from the peripheral radial distance. In various embodiments, the at least one surface defining the at least one secondary debris channel may intersect a surface defining the at least one debris port. An intersection region between the at least one secondary debris channel and the surface defining the at least one debris port may form an edge feature that is disposed radially inward from the peripheral radial distance. In at least one embodiment, the at least one cutting element may comprise two cutting elements positioned circumferentially substantially 180° apart with substantially the same back rake and side rake angles. The instant disclosure is also directed to a roof-bolt drilling apparatus comprising the exemplary roof-bolt drill bit and a drill steel rotatable about the rotational axis.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
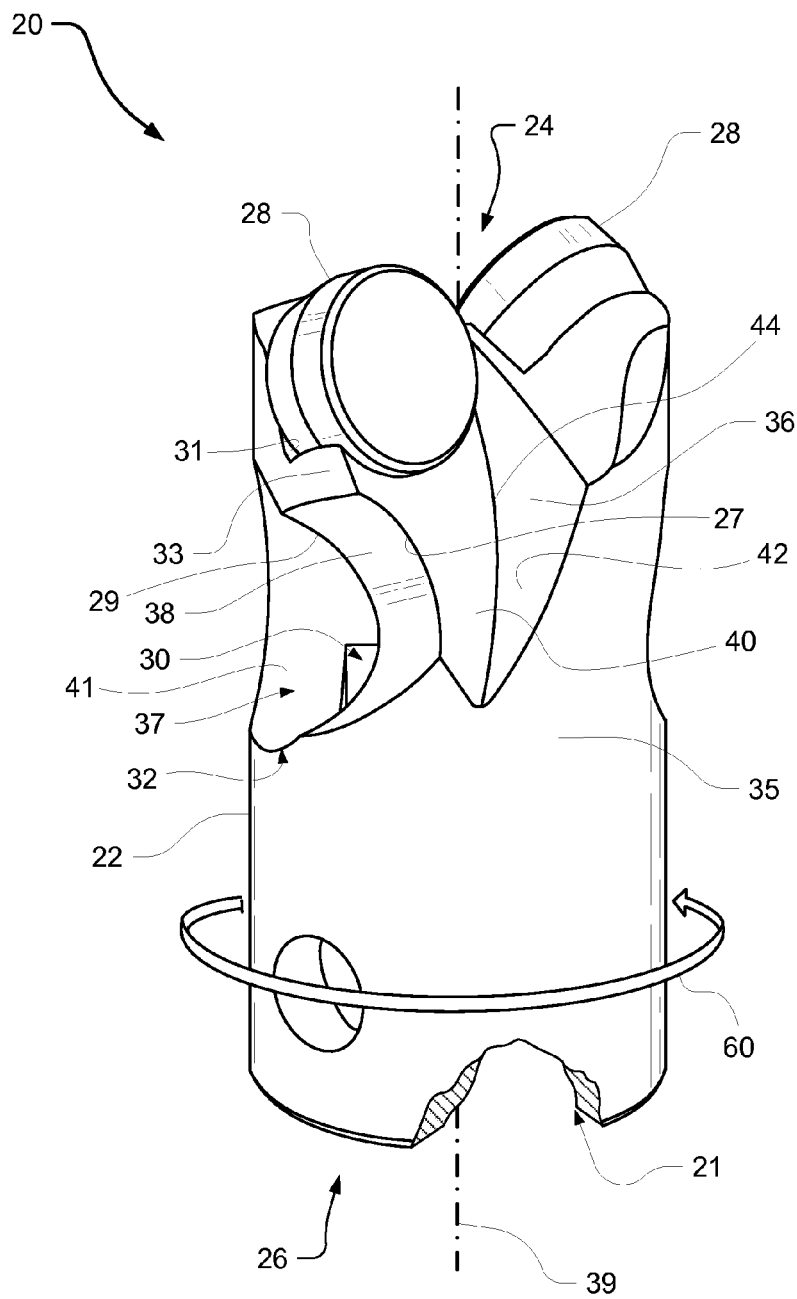
FIG. 1 is a partial cut-away perspective view of an exemplary drill bit according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure is directed to exemplary rotary drill bits for drilling formations in various environments. For example, a rotary drill bit may be coupled to a drill steel and rotated by a rotary drilling apparatus configured to rotate the rotary drill bit relative to a subterranean formation. For ease of use, the word "cutting," as used in this specification and claims, may refer broadly to machining processes, drilling processes, boring processes, or any other material removal process.

FIG. 1 is a partial cut-away perspective view of an exemplary drill bit 20 according to at least one embodiment. Drill bit 20 may represent any type or form of earth-boring or drilling tool, including, for example, a rotary borehole drill bit. Drill bit 20 may be formed of any material or combination of materials, such as steel or molded tungsten carbide, without limitation.

As illustrated FIG. 1, drill bit 20 may comprise a bit body 22 having a forward end 24 and a rearward end 26. In some embodiments, drill bit 20 may be configured to be rotated about a rotational axis 39 that extends between forward end 24 and rearward end 26 of bit body 22. For example, as shown in FIG. 1, drill bit 20 may be configured to be rotated about rotational axis 39 in rotational direction 60. Drill bit 20 may be rotated using a suitable attachment connected to rearward end 26 of bit body 22. For example, a drill steel (such as drill steel 166 shown in FIG. 6) of a drilling apparatus may be used to rotate drill bit 20 in rotational direction 60 during drilling of a borehole.

Figure 2:
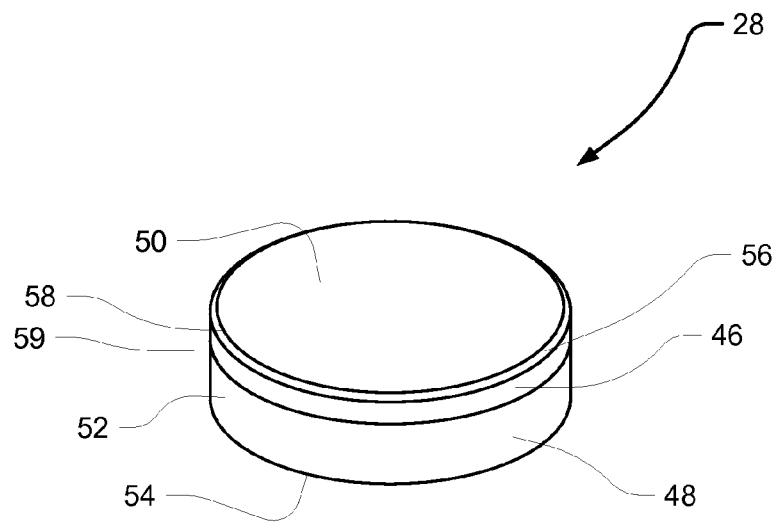
FIG. 2 is a perspective view of an exemplary cutting element according to at least one embodiment.

At least one cutting element 28 may be coupled to bit body 22. For example, as shown in FIG. 1, a plurality of cutting elements 28 may be coupled to forward end 24 of bit body 22. FIG. 2 shows an exemplary cutting element 28 that may be coupled to exemplary bit body 22 in FIG. 1. As illustrated in FIG. 2, cutting element 28 may comprise a layer or table 46 affixed to or formed upon a substrate 48. Table 46 may be formed of any material or combination of materials suitable for cutting subterranean formations, including, for example, a superhard or superabrasive material such as polycrystalline diamond (PCD). The word "superhard," as used herein, may refer to any material having a hardness that is at least equal to a hardness of tungsten carbide. Similarly, substrate 48 may comprise any material or combination of materials capable of adequately supporting a superabrasive material during drilling of a subterranean formation, including, for example, cemented tungsten carbide.

For example, cutting element 28 may comprise a table 46 comprising polycrystalline diamond bonded to a substrate 48 comprising cobalt-cemented tungsten carbide. In at least one embodiment, after forming table 46, a catalyst material (e.g., cobalt or nickel) may be at least partially removed from table 46. A catalyst material may be removed from at least a portion of table 46 using any suitable technique, such as, for example, acid leaching.

As shown in FIG. 2, cutting element 28 may also comprise a cutting face 50 formed by table 46, a side surface 52 formed by table 46 and substrate 48, and a back surface 54 formed by substrate 48. According to various embodiments, cutting face 50 may be substantially planar and side surface 52 may be substantially cylindrical and optionally perpendicular to cutting face 50. Back surface 54 may be, in some embodiments, substantially parallel to cutting face 50. Cutting face 50 and side surface 52 may be formed in any suitable shape, without limitation. In one embodiment, cutting face 50 may have a substantially arcuate periphery. For example, cutting face 50 may have a substantially circular periphery as illustrated in FIG. 2.

As illustrated in FIG. 2, cutting element 28 may also comprise a chamfer 56 formed along at least a portion of a periphery of table 46 between cutting face 50 and side surface 52. Table 46 may also include any other suitable surface shape between cutting face 50 and side surface 52, including, without limitation, an arcuate surface, a sharp edge, and/or a honed edge. Chamfer 56 may be configured to contact and/or cut a solid material, such as a subterranean formation, as drill bit 20 is rotated and forced against a given material (as will be described in greater detail below in connection with FIG. 6). In at least one embodiment, the phrase "cutting edge" or its variants may refer to an edge portion of cutting element 28 that is exposed to and/or in contact with a formation or material being cut during drilling. In some embodiments, cutting element 28 may comprise one or more cutting edges, such as an edge 58 and/or an edge 59. Edge 58 and/or edge 59 may be formed adjacent chamfer 56 and may be configured to be exposed to and/or in contact with a material being cut during drilling.

As shown in FIG. 1, cutting elements 28 may be coupled to bit body 22 using any suitable technique, including, for example, brazing or welding. According to some embodiments, back surfaces of cutting elements 28 (such as back surface 54 shown in FIG. 2) may be mounted and secured to mounting surfaces on bit body 22, such as mounting surface 31 shown in FIG. 1. Additionally, each cutting element 28 may be positioned on bit body 22 adjacent to and/or abutting a support member 33. As illustrated in FIG. 1, support member 33 may comprise a projection extending away from mounting surface 31. Support member 33 may counteract various forces applied to cutting element 28 during drilling, including forces acting on cutting element 28 as drill bit 20 is rotated in rotational direction 60. In at least one embodiment, two cutting elements 28 may be positioned on bit body 22 circumferentially substantially 180° apart with substantially the same back rake and substantially the same side rake angles.

In at least one embodiment, an internal passage 30 may be defined within bit body 22. As illustrated in FIG. 1, internal passage 30 may extend from a rearward opening 21 defined by rearward end 26 of bit body 22 to at least one debris port 37 defined in a side portion of bit body 22 by debris port surface 41. As shown in FIG. 1, a debris opening 32 may be defined in a side portion of bit body 22 that is located axially rearward from cutting element 28 and/or at least a portion of cutting element 28 and debris port 37 may extend between debris opening 32 and internal passage 30. In one embodiment, debris port 37 may extend along a straight path and may extend in a generally radial direction relative to rotational axis 39. Debris port 37 may be formed using any suitable technique. For example, debris port 37 may be formed in bit body 22 by plunging a milling tool, such as a milling cutter, along a straight path extending between a surface of bit body 22 and internal passage 30. In at least one embodiment, one debris opening 32 may be defined in bit body 22 for each cutting element 28. For example, two debris openings 32 may be defined in bit body 22, with the two debris openings 32 corresponding to the two respective cutting elements 28 illustrated in FIG. 1.

As illustrated in FIG. 1, bit body 22 may have a peripheral side surface 35 defining an outer periphery of bit body 22. Peripheral side surface 35 may comprise any suitable shape, such as, for example, a generally cylindrical shape. Peripheral side surface 35 may define an outer portion of bit body 22 and may be optionally configured to maintain a borehole size during drilling. In at least one embodiment, peripheral side surface 35 may extend to a certain peripheral radial distance measured relative to a rotational axis of drill bit 20, such as rotational axis 39.

According to some embodiments, at least one debris channel may be defined in bit body 22 of drill bit 20. Such debris channels may be configured to accept debris, such as cutting debris generated during a drilling operation from cutting elements 28. Debris may move along the at least one debris channel to the at least one debris opening 32 and may be drawn into and through internal passage 30 by a vacuum source. In some embodiments, drill bit 20 may include a primary debris channel 36 and a secondary debris channel 38 defined in bit body 22. As will be illustrated in greater detail below in connection with FIG. 6, primary debris channel 36 and/or secondary debris channel 38 may be configured to facilitate cleaning of debris generated by cutting elements 28 from the forward end 24 of bit body 22. Primary debris channel 36 and/or secondary debris channel 38 may be defined radially inward from the peripheral radial distance of peripheral side surface 35.

Each primary debris channel 36 may be formed to any suitable shape, size, and/or configuration, without limitation. For example, as illustrated in FIG. 1, primary debris channel 36 may be defined by a machined path extending between a region adjacent to cutting element 28 and a portion of bit body 22 located rearward relative to cutting element 28. Primary debris channel 36 may be configured to direct debris from cutting element 28 generally toward secondary debris channel 38 and/or debris opening 32. Primary debris channel 36 may be defined by a plurality of surfaces. For example, primary debris channel 36 may be defined by a first channel surface 40 and a second channel surface 42, as shown in FIG. 1. Primary debris channel 36 may be formed using any suitable technique. For example, primary debris channel 36 may be formed by cutting material away from a portion of bit body 22 using a cutting tool, such as an end mill. In such a configuration, first channel surface 40 may be substantially planar.

First channel surface 40 of primary debris channel 36 may extend from a region adjacent cutting element 28 in a generally rearward direction. In at least one embodiment, a forward portion of first channel surface 40 may be proximate to a portion of cutting element 28. As illustrated in FIG. 1, the forward portion of first channel surface 40 may define an edge of support member 33 that has a shape that is complementary to the rearward portion of cutting element 28. First channel surface 40 may comprise any suitable shape, such as a substantially planar shape, without limitation. In some embodiments, first channel surface 40 may be substantially parallel to cutting face 50 of cutting element 28. First channel surface 40 may be formed such that cutting face 50 and first channel surface 40 are in the same plane. In additional embodiments, first channel surface 40 may be formed in a plane intersecting a side surface of cutting element 28 (such as side surface 52 illustrated in FIG. 2).

Second channel surface 42 may extend from a region adjacent a side surface of cutting element 28 (such as side surface 52 illustrated in FIG. 2) in a generally rearward direction. In at least one embodiment, second channel surface 42 may comprise a sloping and/or curved surface extending between the region adjacent cutting element 28 and peripheral side surface 35 at an oblique angle relative to rotational axis 39. For example, second channel surface 42 may slope away from the region adjacent cutting element 28 in a generally rearward direction. Second channel surface 42 may comprise any suitable shape, such as a substantially planar or convex shape, without limitation. According to some embodiments, second channel surface 42 may be oriented at an oblique angle and/or a substantially perpendicular angle relative to first channel surface 40.

In some embodiments, first channel surface 40 and second channel surface 42 of primary debris channel 36 may intersect at a channel intersection region 44. Channel intersection region 44 may comprise an edge, a line, an angled region, a rounded region, a fillet, and/or any other suitable shape disposed at the intersection region of first channel surface 40 and second channel surface 42. In some embodiments, channel intersection region 44 may define a curved path extending between the region adjacent cutting element 28 and peripheral side surface 35.

Each secondary debris channel 38 may be formed to any suitable shape, size, and/or configuration, without limitation. For example, as illustrated in FIG. 1, secondary debris channel 38 may comprise a recess extending between primary debris channel 36 and debris opening 32. In at least one example, secondary debris channel 38 may be adjacent to debris opening 32 and/or at least one surface defining primary debris channel 36, such as first channel surface 40. Secondary debris channel 38 may be configured to accept debris from primary debris channel 36, and allow debris to move toward debris opening 32. Secondary debris channel 38 may be defined by at least one surface. For example, secondary debris channel 38 may be defined by a generally arcuate and/or curved surface.

In at least one embodiment, the surface defining secondary debris channel 38 may curve radially inward from peripheral side surface 35 so that secondary debris channel 38 is open to primary debris channel 36 and/or debris opening 32. In some embodiments, an intersection region between first channel surface 40 and secondary debris channel 38 may form an edge feature 27, as shown in FIG. 1. In at least one embodiment, secondary debris channel 38 may be a portion of a cylindrical surface that is formed by, for example, plunging a milling tool, such as a milling cutter, along a straight path through a portion of bit body 22. In some embodiments, an intersection region between secondary debris channel 38 and debris port surface 41 defining debris port 37 may form an edge feature 29, as shown in FIG. 1. Such a configuration may provide a direct and relatively large conduit through which cuttings can pass during drilling (as opposed to a helical path, for instance).

Figure 3:
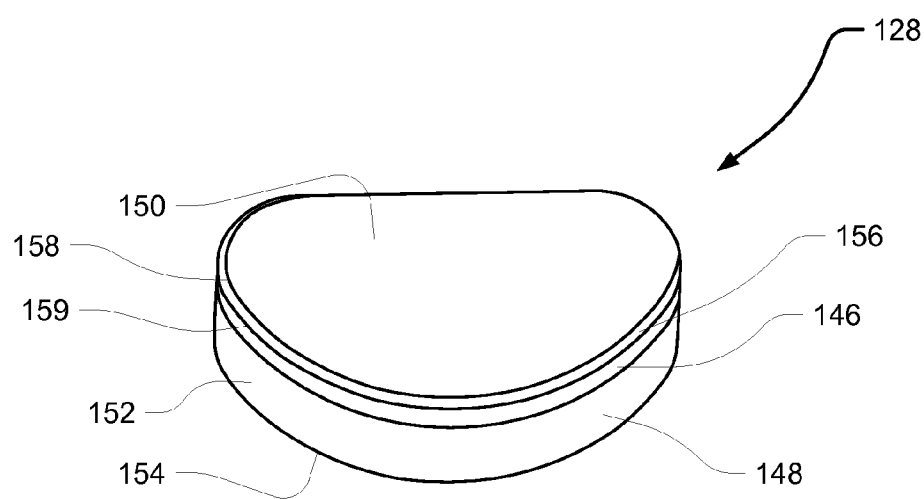
FIG. 3 is a perspective view of an exemplary cutting element according to at least one embodiment.
Figure 4:
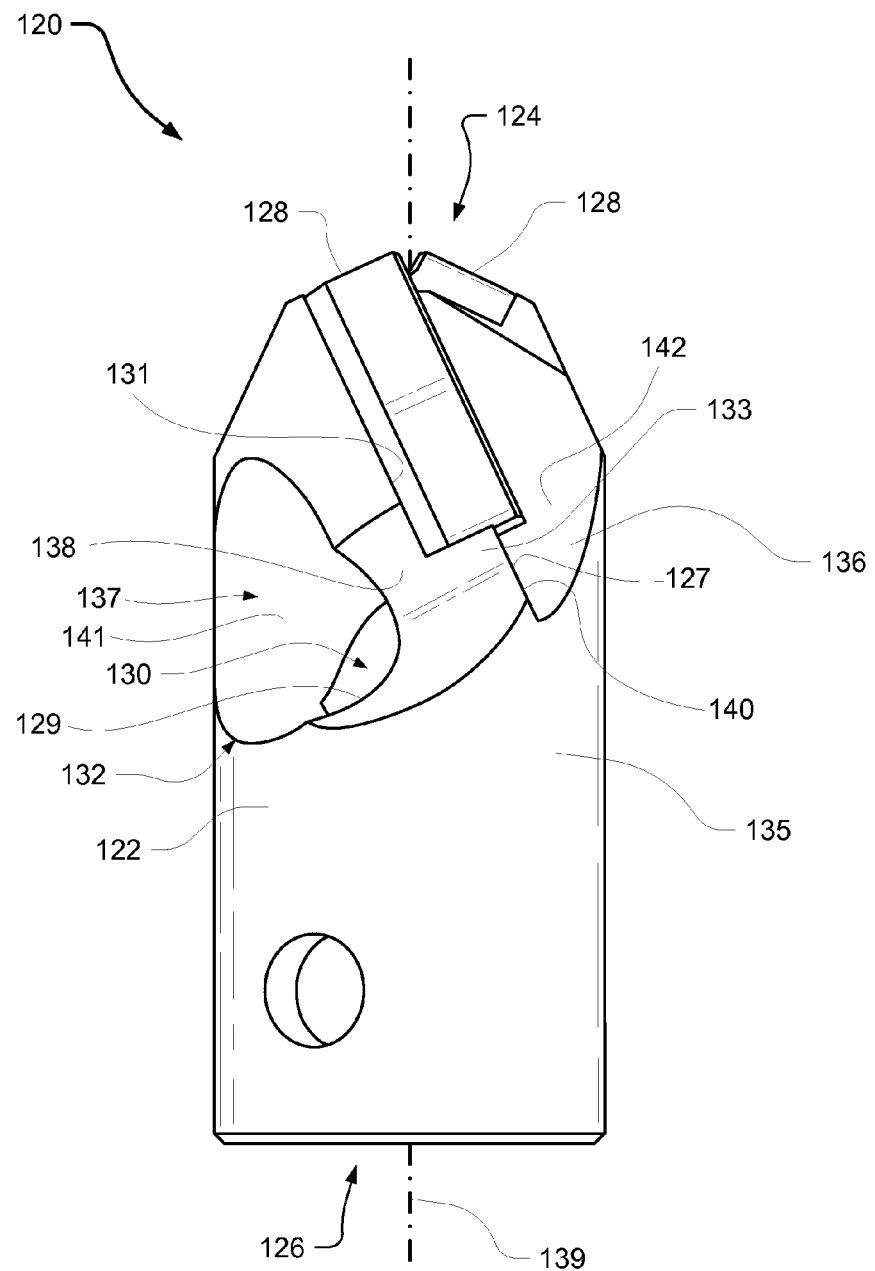
FIG. 4 is a side view of an exemplary drill bit according to at least one embodiment.

FIG. 3 shows an exemplary cutting element 128 that may be coupled to a bit body (such as exemplary bit body 122 illustrated in FIG. 4). As illustrated in FIG. 3, cutting element 128 may comprise a table 146 affixed to a substrate 148. Cutting element 128 may also comprise a cutting face 150 formed by table 146, a side surface 152 formed by table 146 and substrate 148, and a back surface 154 formed by substrate 148. In at least one embodiment, cutting face 150 may have a substantially arcuate periphery. For example, as shown in FIG. 3, cutting face 150 may have a substantially semi-circular periphery. In some embodiments, two cutting elements 128 may be cut from a single substantially circular cutting element blank, resulting in two substantially semi-circular cutting elements 128. In some embodiments, angular portions of side surface 152 may be rounded to form a substantially arcuate surface around cutting element 128.

As illustrated in FIG. 3, cutting element 128 may also comprise a chamfer 156 formed along at least a portion of a periphery of table 146 between cutting face 150 and side surface 152. Table 146 may also include any other suitable surface shape between cutting face 150 and side surface 152, including, without limitation, an arcuate surface, a sharp edge, and/or a honed edge. In some embodiments, cutting element 128 may comprise one or more cutting edges, such as at least a portion of edge 158 and/or at least a portion of edge 159. Edge 158 and/or edge 159 may be formed adjacent chamfer 156 and at least portions of edge 158 and/or edge 159 may be configured to be exposed to and/or in contact with a material being cut during drilling.

Figure 5:
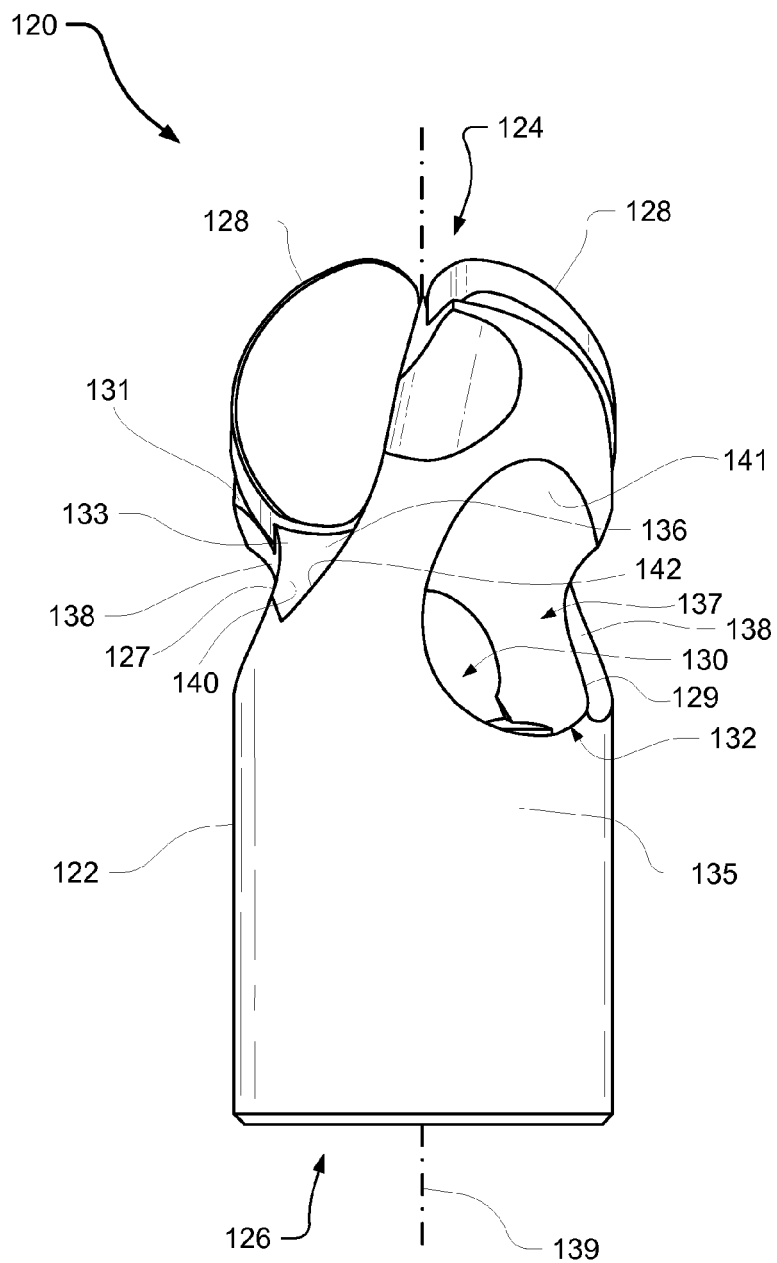
FIG. 5 is a side view of the exemplary drill bit of FIG. 4.

FIGS. 4 and 5 are side views of a drill bit 120 according to various embodiments. As illustrated in FIGS. 4 and 5, drill bit 120 may comprise a bit body 122 having a forward end 124 and a rearward end 126. Drill bit 120 may be configured to be rotated about a rotational axis 139 that extends between forward end 124 and rearward end 126 of bit body 122. At least one cutting element, such as cutting element 128 shown in FIG. 3, may be coupled to bit body 122. For example, as shown in FIGS. 4 and 5, a plurality of cutting elements 128 may be coupled to forward end 124 of bit body 122. According to some embodiments, back surfaces of cutting elements 128 (such as back surface 154 shown in FIG. 3) may be coupled to mounting surfaces on bit body 122, such as mounting surface 131. Additionally, each cutting element 128 may be positioned on bit body 122 adjacent to and/or abutting a support member 133. For example, cutting element 128 may be brazed to bit body 122.

In at least one embodiment, an internal passage 130 may be defined within bit body 122. In some embodiments internal passage 130 may extend from a rearward opening of bit body 122 (such as rearward opening 21 defined in rearward end 26 as illustrated in FIG. 1) to at least one debris port 137 defined in a side portion of bit body 122 by debris port surface 141. As shown in FIGS. 4 and 5, a debris opening 132 may be defined in a side portion of bit body 122 that is located axially rearward from cutting element 128 and/or at least a portion of cutting element 128 and debris port 137 may extend between debris opening 132 and internal passage 130. In one embodiment, debris port 137 may extend along a straight path and may extend in a generally radial direction relative to rotational axis 139. Debris port 137 may be formed using any suitable technique, such as, for example, by plunging a milling tool, such as a milling cutter, along a straight path extending between a surface of bit body 122 and internal passage 130.

As illustrated in FIGS. 4 and 5, bit body 122 may have a peripheral side surface 135 defining an outer periphery of bit body 122. Peripheral side surface 135 may comprise any suitable shape, such as, for example, a generally cylindrical shape. Peripheral side surface 135 may define an outer portion of bit body 122 and may be optionally configured to maintain a borehole size during drilling. In at least one embodiment, peripheral side surface 135 may extend to a certain peripheral radial distance measured relative to a rotational axis of drill bit 120, such as rotational axis 139. According to some embodiments, at least one debris channel may be defined in bit body 122 of drill bit 120. For example, drill bit 120 may include a primary debris channel 136 and a secondary debris channel 138 defined in bit body 122. As will be illustrated in greater detail below in connection with FIG. 6, primary debris channel 136 and secondary debris channel 138 may be configured to facilitate cleaning of debris generated by cutting elements 128 from the forward end 124 of bit body 122.

Primary debris channel 136 may be formed to any suitable shape, size, and/or configuration, without limitation. For example, as illustrated in FIGS. 4 and 5, primary debris channel 136 may be defined by a machined path extending between a region adjacent to cutting element 128 and a portion of bit body 122 located rearward relative to cutting element 128. Primary debris channel 136 may be configured to direct debris from cutting element 128 generally toward secondary debris channel 138 and/or debris opening 132. Primary debris channel 136 may be defined by a plurality of surfaces. For example, primary debris channel 136 may be defined by a first channel surface 140 and a second channel surface 142, as shown in FIGS. 4 and 5. Primary debris channel 136 may be formed using any suitable technique, such as, for example, by cutting material away from a portion of bit body 122 using a cutting tool, such as an end mill. In such a configuration, first channel surface 140 may be substantially planar.

First channel surface 140 of primary debris channel 136 may extend from a region adjacent cutting element 128 in a generally rearward direction. Second channel surface 142 may extend from a region adjacent a side surface of cutting element 128 (such as side surface 152 illustrated in FIG. 3) in a generally rearward direction. In at least one embodiment, second channel surface 142 may comprise a sloping and/or curved surface extending between the region adjacent cutting element 128 and peripheral side surface 135 at an oblique angle relative to rotational axis 139. For example, second channel surface 142 may slope away from a region adjacent the side surface of cutting element 128 in a generally rearward direction. In some embodiments, first channel surface 140 and second channel surface 142 of primary debris channel 136 may intersect at a channel intersection region (such as channel intersection region 144 illustrated in FIG. 6).

As illustrated in FIGS. 4 and 5, secondary debris channel 138 may comprise a recess extending between primary debris channel 136 and debris opening 132. Secondary debris channel 138 may be configured to accept debris from primary debris channel 136, and allow debris to move toward debris opening 132. Secondary debris channel 138 may be defined by at least one surface. For example, secondary debris channel 138 may be defined by a generally arcuate and/or curved surface. In some embodiments, an intersection region between first channel surface 140 and secondary debris channel 138 may form an edge feature 127, as shown in FIGS. 4 and 5. In at least one embodiment, secondary debris channel 138 may be a portion of a cylindrical surface that is formed by, for example, plunging a milling tool, such as a milling cutter, along a straight path through a portion of bit body 122. In some embodiments, an intersection region between secondary debris channel 138 and debris port surface 141 defining debris port 137 may form an edge feature 129, as shown in FIGS. 4 and 5.

Figure 6:
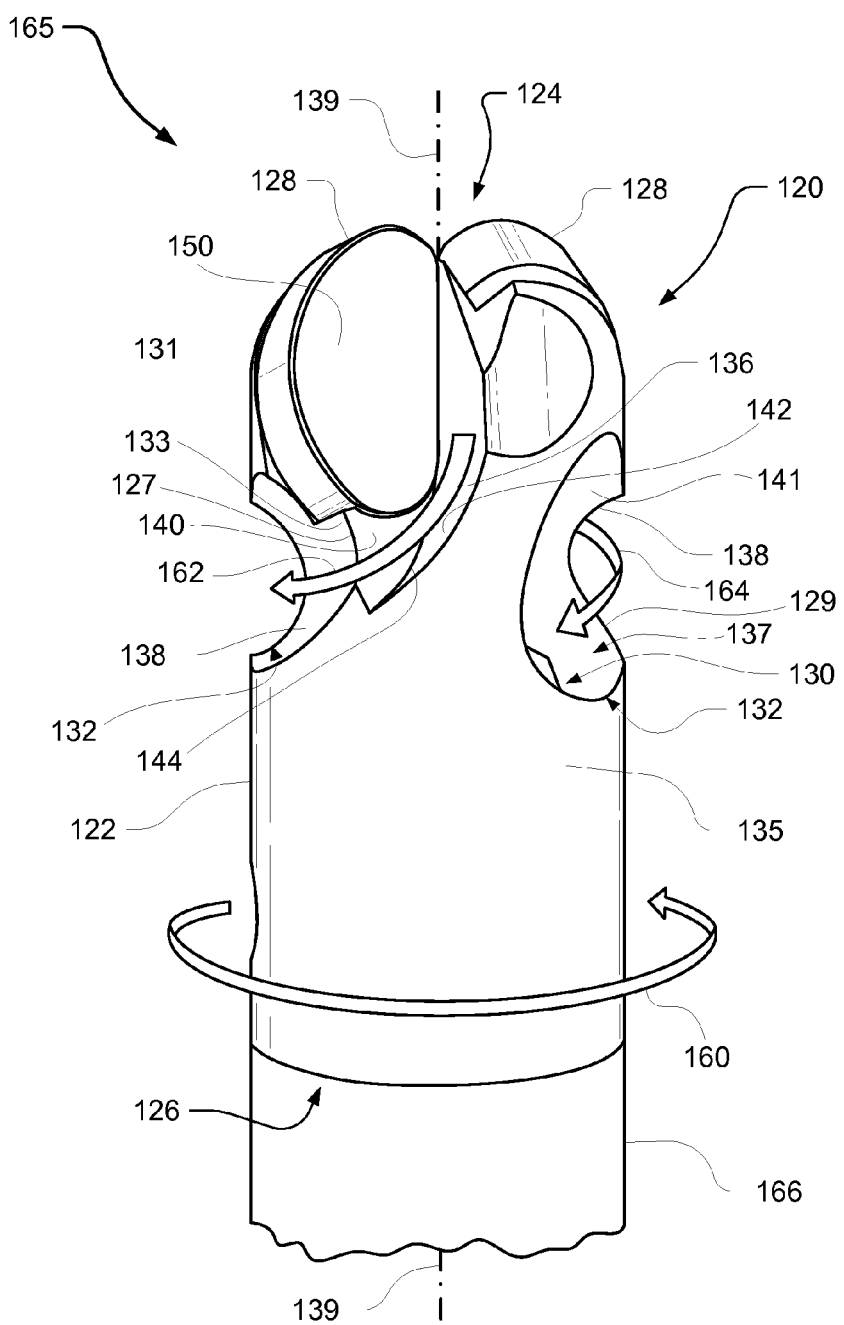
FIG. 6 is a perspective view of an exemplary drilling apparatus including the drill bit of FIG. 4 according to at least one embodiment.

FIG. 6 is a perspective view of a portion of an exemplary drilling apparatus 165 comprising the drill bit 120 illustrated in FIGS. 4 and 5 coupled to a drill steel 166. FIG. 6 illustrates flow patterns of debris, such as cutting debris, during a drilling operation in which a vacuum is applied to drilling bit 120 via internal passage 130 defined in bit body 122. As shown in FIG. 6, rearward end 126 of drill bit 120 may be coupled to drill steel 166 (e.g., by threaded connection, pin connection, and/or other suitable coupling). Drill steel 166 may comprise any suitable type of drilling rod or other suitable connection member configured to connect drill bit 120 to a drilling apparatus, without limitation. In some examples, drill steel 166 may comprise a substantially elongated shaft (e.g., a cylindrical shaft) having coupling surfaces corresponding to surfaces defined within drill bit 120. For example, drill steel 166 may comprise a hexagonal and/or threaded periphery corresponding to a hexagonal and/or threaded interior surface defined within drill bit 120. In some examples, drill steel 166 may comprise a pin connector corresponding to a pin hole and/or a recess defined within drill bit 120.

According to at least one embodiment, force may be applied by a drilling motor to drill bit 120 via drill steel 166, causing drill bit 120 to be forced against a subterranean formation in both rotational direction 160 and a forward direction. As illustrated in FIG. 6, cutting faces 150 on cutting elements 128 may face generally in rotational direction 160 and may be angled with respect to rotational direction 160. As drill bit 120 is forced against a subterranean formation and rotated in rotational direction 160, cutting edges of cutting elements 128 (such as chamfer 156 illustrated in FIG. 3) may contact and cut into the formation, removing rock material from the formation in the form of rock cuttings and/or other debris. The cuttings removed by cutting elements 128 may be drawn through internal passage 130 defined in bit body 122 by a vacuum applied to drill bit 120.

According to at least one embodiment, drilling apparatus 165 may be used to drill a borehole in an overhead surface structure, such as a mine roof. In such an embodiment, drill bit 120 may be axially oriented in a direction so that the forward end 124 of drill bit 120 faces toward a ceiling/wall of the mine. As material is removed from the structure by cutting elements 128, at least some of the resulting debris may pass through debris opening 132 into internal passage 130 defined within bit body 122. For example, debris may be drawn through debris opening 132 into internal passage 130 by a vacuum applied to drill bit 120. According to some embodiments, drill steel 166 may comprise a hollow rod and a vacuum may be applied to a rearward end of drill steel 166 by a vacuum source. Cutting debris may be drawn by the vacuum through drill bit 120 and drill steel 166 toward the vacuum source.

During drilling operations, primary debris channels 136 and/or secondary debris channels 138 may facilitate movement of debris from cutting elements 128 and/or forward end 124 of bit body 122 toward debris openings 132 defined in drill bit 120. For example, as illustrated in FIG. 6, primary debris channels 136 and secondary debris channels 138 may direct debris generally along paths 162 and 164 when drill bit 120 is rotated in rotational direction 160 during drilling. Paths 162 and/or 164 may extend in a stepwise manner from a region at and/or adjacent to cutting elements 128 along primary debris channel 136 and secondary debris channel 138. Movement of debris along paths 162 and/or 164 through primary debris channel 136 and secondary debris channel 138 may also be facilitated by gravitational forces acting in the axially rearward direction, the rotation of drill bit 120 in rotational direction 160, and/or suction applied to drill bit 120.

At least one of first channel surface 140 and second channel surface 142 of primary debris channel 136 may direct debris along path 162 toward secondary debris channel 138. In at least one embodiment, second channel surface 142 may slope and/or curve at an oblique angle relative to rotational axis 139 such that debris is guided along path 162 toward secondary debris channel 138. Debris from primary debris channel 136 may be directed along path 162 toward debris opening 132 by secondary debris channel 138. As illustrated in FIG. 6, secondary debris channel 138 may be open to primary debris channel 136. Debris from secondary debris channel 138 may be directed along path 164 through debris opening 132. For example, secondary debris channel 138 may be open to debris opening 132 such that debris may flow from secondary debris channel 138 to debris opening 132 along path 164 when drill bit 120 is rotated in direction 160 during drilling. The debris directed through debris opening 132 may then be drawn through internal passage 130 by a vacuum source applied to internal passage 130 defined in bit body 122.

Because primary debris channel 136 and secondary debris channel 138 are defined radially inward from peripheral side surface 135, the debris may flow between the surfaces defining primary debris channel 136 and secondary debris channel 138 and a side of a borehole being drilled, such as a borehole formed in a subterranean rock formation. Primary debris channel 136 and secondary debris channel 138 may provide a relatively larger path for debris to move along an exterior portion of bit body 122. Accordingly, cutting debris may be directed along primary debris channel 136 and secondary debris channel 138 away from cutting elements 128 and/or portions of drill bit 120 near cutting elements 128. Additionally, because debris opening 132 is defined in a side portion of bit body 122 located axially rearward from at least a portion of cutting element 128, cutting debris may be directed along path 164 through primary debris channel 136 and secondary debris channel 138.

By directing debris away from cutting elements 128 and forward end 124 of bit body 122, the amount of heat generated in cutting elements 128 and bit body 122 due to friction between drill bit 120 and a material being drilled may be reduced, thereby preventing wear and/or damage to drill bit 120. Additionally, directing debris away from cutting elements 128 and forward end 124 of bit body 122 may prevent clogging of drill bit 120 and loss of suction, thereby increasing the rate of penetration of drill bit 120 into a material being drilled.

The preceding description has been provided to enable others skilled the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for manufacturing a roof-bolt drill bit, the method comprising:
   providing a bit body rotatable about a rotational axis in a rotational direction, the rotational axis extending between a forward end and a rearward end of the bit body, the bit body comprising a mounting region for mounting at least one cutting element to the bit body;
   forming at least one primary debris channel defined by a first channel surface and a second channel surface of the bit body, the first channel surface and the second channel surface each extending from adjacent the mounting region to a portion of the bit body located axially rearward from the mounting region;
   forming at least one secondary debris channel in the bit body by machining a portion of the bit body along a substantially straight path to form an intersection with the primary debris channel.

2. The method of claim 1, wherein the forming the at least one secondary debris channel in the bit body comprises plunging a milling tool through a portion of the bit body along the substantially straight path.

3. The method of claim 1, wherein the bit body further comprises:
   at least one mounting surface at the mounting region of the bit body;
   at least one debris port defined in a side portion of the bit body at a location axially rearward from the at least one mounting surface;
   an internal passage defined within the bit body, the internal passage extending between the at least one debris port and the rearward end of the bit body.

4. The method of claim 1, wherein the substantially straight path extends from the primary debris channel to the at least one debris port.

5. The method of claim 1, wherein the at least one secondary debris channel extends along a non-helical path.

6. The method of claim 1, wherein:
   the bit body further comprises a peripheral side surface located at a peripheral radial distance relative to the rotational axis;
   the forming the at least one secondary debris channel in the bit body comprises forming at least one surface defining the at least one secondary debris channel, the at least one surface extending radially inward from the peripheral radial distance.

7. The method of claim 6, wherein the at least one surface defining the at least one secondary debris channel comprises a generally arcuate surface.

8. The method of claim 6, wherein the at least one surface defining the at least one secondary debris channel comprises a partial-cylindrical surface.

9. The method of claim 1, wherein an intersection region between the at least one primary debris channel and the at least one secondary debris channel forms an edge feature that is disposed radially inward from the peripheral radial distance.

10. The method of claim 1, wherein the substantially straight path extends at an angle that is nonparallel to the first channel surface and the second channel surface.

11. The method of claim 1, further comprising coupling the at least one cutting element to the mounting region of the bit body.

12. The method of claim 11, wherein the at least one cutting element comprises a polycrystalline diamond material.

13. The method of claim 1, further comprising forming at least one mounting surface at the mounting region of the bit body.

14. A method for manufacturing a roof-bolt drill bit, the method comprising:
   providing a bit body rotatable about a rotational axis in a rotational direction, the rotational axis extending between a forward end and a rearward end of the bit body, the bit body comprising:
   a mounting region for mounting at least one cutting element to the bit body, at least one primary debris channel defined by a first channel surface and a second channel surface of the bit body, the first channel surface and the second channel surface each extending from adjacent the mounting region to a portion of the bit body located axially rearward from the mounting region;

forming at least one secondary debris channel in the bit body by machining a portion of the bit body along a substantially straight path to form an intersection with the primary debris channel.

15. The method of claim 14, wherein the forming the at least one secondary debris channel in the bit body comprises plunging a milling tool through a portion of the bit body along the substantially straight path.

16. The method of claim 1, wherein the first channel surface intersects the second channel surface at an intersection region that extends from adjacent the mounting region to a portion of the bit body located axially rearward from the mounting region.

17. The method of claim 1, wherein the at least one primary debris channel comprises a concave channel defined by the first channel surface and the second channel surface.

* * * * *